United States Patent
Garg et al.

(10) Patent No.: US 7,542,456 B2
(45) Date of Patent: Jun. 2, 2009

(54) SYSTEM AND METHOD FOR SPLITTING A COMMUNICATION DATA STREAM

(75) Inventors: Hari Krishna Garg, Singapore (SG); Raj Krishna, Singapore (SG)

(73) Assignee: National University of Singapore, Singapore (SG)

( * ) Notice: Subject to any disclaimer, the term of this patent is extended or adjusted under 35 U.S.C. 154(b) by 507 days.

(21) Appl. No.: 11/018,210

(22) Filed: Dec. 21, 2004

(65) Prior Publication Data

US 2005/0163093 A1    Jul. 28, 2005

Related U.S. Application Data (60) Provisional application No. 60/539,340, filed on Jan. 28, 2004, provisional application No. 60/575,808, filed on Jun. 2, 2004, provisional application No. 60/585,581, filed on Jul. 7, 2004, provisional application No. 60/605,146, filed on Aug. 30, 2004, provisional application No. 60/613,220, filed on Sep. 28, 2004.

(51) Int. Cl.
*H04W 4/00*    (2009.01)
(52) U.S. Cl. .............. 370/341; 370/349; 370/328; 370/329; 370/334; 455/11.1
(58) Field of Classification Search .......... 370/341, 370/349, 328–329, 334; 455/11.1
See application file for complete search history.

(56) References Cited

U.S. PATENT DOCUMENTS

| 5,771,229 | A | 6/1998 | Gavrilovich |
| 6,788,686 | B1 | 9/2004 | Khotimsky et al. |
| 6,842,446 | B2 * | 1/2005 | Everson et al. ............. 370/349 |
| 2003/0013468 | A1 | 1/2003 | Khatri |
| 2004/0032910 | A1 | 2/2004 | Horng et al. |
| 2004/0196798 | A1 | 10/2004 | Abousleman |
| 2006/0063546 | A1 * | 3/2006 | Fischer ................. 455/517 |

FOREIGN PATENT DOCUMENTS

| WO | WO 03/090485 A1 | 10/2003 |
| WO | 2004/016019 | 2/2004 |

* cited by examiner

*Primary Examiner*—Lester Kincaid
*Assistant Examiner*—Charles Shedrick
(74) *Attorney, Agent, or Firm*—Christie, Parker & Hale LLP.

(57) ABSTRACT

A method of conducting communication over one or more communication networks without making any change to the communication network infrastructure, the method comprising: selectively establishing $L \geq 2$ communication paths between first and second devices, each communication path comprising one or more communication channels of one of the communication networks; splitting a communication data stream from the first device into at least L sub-streams; transmitting the sub-streams via the L communication paths; and combining the sub-streams for processing at the second device.

29 Claims, 9 Drawing Sheets

SYSTEM AND METHOD FOR SPLITTING A COMMUNICATION DATA STREAM

CROSS REFERENCE TO RELATED APPLICATIONS

This application claims the benefit of U.S. Provisional Application Nos.: 60/539,340, filed Jan. 28, 2004; Ser. No. 60/575,808, filed Jun. 2, 2004; Ser. No. 60/585,581, filed Jul. 7, 2004; Ser. No. 60/605,146, filed Aug. 30, 2004; and Ser. No. 60/613,220, filed Sep. 28, 2004, which are incorporated by reference as if fully set forth

FIELD OF INVENTION

The present invention relates broadly to a method of conducting communication over one or more communication networks, and to a communication device.

BACKGROUND

Within the framework of cellular/mobile networks (GSM, CDMA, GPRS, EDGE, 3G etc being instances of such network infrastructures), the currently existing methods for communication are implemented using one or more channels from one or more base stations (BSs) of the network infrastructure of one cellular/mobile service provider. Each channel can contribute to the data transmission and hence the overall data rate can be increased when more than one channel is used.

However, where more than one channels are to be used some changes need to be made in the network infrastructure as the existing technique require co-ordination of transmissions and other functions among one or more BSs, and some other functions performed by the service provider. Also, multi-channel communication may not have been implemented in many places and is hence not available. Further, even in places where multi-channel communication has been implemented, it may not have been implemented under a uniform telecommunications' standard (such as GSM, CDMA etc) and hence may not be available in a roaming environment from one place to another. If a mobile is in cell K of a cellular/mobile service provider, the Quality of Service (QoS) of the data transmissions from BSs belonging to cells other than cell K may not be of an acceptable level and other techniques may have to be incorporated for improving it.

Since the total number of channels available in a cell may be predetermined, the network infrastructure of the cellular/mobile service provider may not be able to sustain the demand as the number of users demanding such a service grows. Also the cost of getting this service from a single cellular/mobile service provider may be high. Further, such a service may not be available to roaming users.

U.S. Pat. No. 5,771,229 discloses a method for combining channels from the same cellular/mobile service provider in order to increase the data rate for communication between a mobile station (MS) and a high speed data server connected to the base station controller. That method requires that several channels of the same cellular/mobile service provider must be available in the same cell for communication to take place. Also several hand-offs need to occur simultaneously that could slow down the data transfer as it will require availability of that many channels in neighboring cells as well. Even though the channels are controlled independently, the overall network infrastructure still requires changes such as inverse multiplexers and intelligent peripherals.

WO Patent Publication No. 2004016019 describes a method for combining channels either from the same cellular/mobile service provider or from two different cellular/mobile service providers. The method is applicable to all channels being of an identical type (all GSM as described) and further the method requires changes to the network infrastructure as well as roaming agreements among the two or more cellular/mobile service providers. Both the methods in U.S. Pat. No. 5,771,229, and WO2004106019 are concerned with increasing the data rate for communication between a mobile station (MS) and a data server that communicates with the network infrastructure of the cellular/mobile service provider.

SUMMARY

In accordance with a first aspect of the present invention there is provided a method of conducting communication over one or more communication networks, the method comprising selectively establishing $L \geq 2$ communication paths between first and second devices, each communication path comprising one or more communication channels of one of the communication networks; splitting a communication data stream from the first device into at least L sub-streams; transmitting the sub-streams via the L communication paths; and combining the sub-streams for processing at the second device.

The communication paths may comprise communication paths of different types.

At least two communication paths may be provided by the same communication networks.

The communication paths from one communication network may comprise communication paths of different types.

At least two sub-streams may be transmitted over the same communication paths.

The first, second, or both devices may comprise a mobile station or a data server.

The mobile station may comprise one or more of a group consisting of a phone, a mobile phone, a PDA, a desktop computer, and a laptop computer.

The data server may comprise an intermediate data server connected to a further data server, the Internet, or both via dedicated respective data transfer links.

The method may further comprise determining location information about the first, second, or both devices based on two or more of the communication paths.

Said two or more communication paths may be from different communication networks.

The method may further comprise adding further data to the communication data stream.

The further data may be added prior to, after, or both prior and after the splitting of the communication data stream.

The further data may be added during the splitting of the communication data stream.

The further data may be utilized to improve reliability of the communication.

The method may comprise utilizing coding of the communication data stream to improve the reliability of the communication.

The further data may be utilized to improve a security of the communication.

The method may comprise utilizing one or more of a group consisting of encryption, path hopping, and spread spectrum communications, to improve the security of the communication.

Two or more sub-streams may be encrypted using different encryption codes.

The method may further comprise compressing the data stream, at least one sub-stream or both.

One or more of the communication paths may comprise a varying number of communication channels between endpoints of the communication path.

One or more of the communication paths may comprise one or more communication channels provided by one or more communication networks under a roaming configuration.

The communication networks may comprise one or more of a group consisting of a cellular/mobile network, a wired network, and a wireless network.

The communication paths may comprise one or more of a group consisting of GSM, EDGE, GPRS, 3G, CDMA, WLAN, LAN, cable, DSL, ADSL, dial-up, and UWB.

The splitting of the communication data stream from the first device into at least L sub-streams may be based on at least one parameter.

The parameters may comprise one or more user preferences.

The parameters may comprise one or more monitored characteristics of respective data paths.

The splitting of the communication data may be adjusted during transfer depending on the parameters.

One or more data protocols used in the transmission of data may be adapted at end points only in transmitting and receiving the at least L sub-streams.

The data protocols may comprise existing protocols, dedicated protocols, or both.

The adaptation of the data protocols may be dependent on an application, performance criteria, or both.

In accordance with a second aspect of the present invention there is provided a communication device comprising means for selectively establishing $L \geq 2$ communication paths to a further device, each communication path comprising one or more communication channels of one of one or more communication networks; means for splitting a communication data stream from the communication device into at least L sub-streams; and means for transmitting the sub-streams via the L communication paths to the further device.

In accordance with a third aspect of the present invention there is provided a communication device comprising means for selectively establishing $L \geq 2$ communication paths to a further device, each communication path comprising one or more communication channels of one of one or more communication networks; means for receiving data sub-streams via the L communication paths; and means for combining the sub-streams into a communication data stream from the further device for processing at the communication device.

In accordance with a fourth aspect of the present invention there is provided a ancillary device for use with a communication device, the ancillary device comprising means for instructing the communication device to selectively establish $L \geq 2$ communication paths to a further device, each communication path comprising one or more communication channels of one or more communication networks; means for splitting a communication data stream from the communication device into at least L sub-streams; and means for instructing the communication device to transmit the sub-streams via the L communication paths to the further device.

In accordance with a fifth aspect of the present invention there is provided a ancillary device for use with a communication device, the ancillary device comprising means for instructing the communication device to selectively establish $L \geq 2$ communication paths to a further device, each communication path comprising one or more communication channels of one of one or more communication networks; and means for combining data sub-streams received at the communication device via the L communication paths into a communication data stream from the further device for processing at the communication device.

In accordance with a sixth aspect of the present invention there is provided a communication device comprising a transceiver selectively establishing $L \geq 2$ communication paths to a further device, each communication path comprising one or more communication channels of one of one or more communication networks; a splitter splitting a communication data stream from the communication device into at least L sub-streams; and wherein the transceiver transmits the sub-streams via the L communication paths to the further device.

In accordance with a seventh aspect of the present invention there is provided a communication device comprising a transceiver for selectively establishing $L \geq 2$ communication paths to a further device, each communication path comprising one or more communication channels of one of one or more communication networks; wherein the transceiver receives data sub-streams via the L communication paths; and a combiner for combining the sub-streams into a communication data stream from the further device for processing at the communication device.

In accordance with a eigths aspect of the present invention there is provided a ancillary device for use with a communication device, the ancillary device comprising a processor for instructing the communication device to selectively establish $L \geq 2$ communication paths to a further device, each communication path comprising one or more communication channels of one or more communication networks; a splitter for splitting a communication data stream from the communication device into at least L sub-streams; and wherein the processor instructs the communication device to transmit the sub-streams via the L communication paths to the further device.

In accordance with a ninth aspect of the present invention there is provided a ancillary device for use with a communication device, the ancillary device comprising a processor for instructing the communication device to selectively establish $L \geq 2$ communication paths to a further device, each communication path comprising one or more communication channels of one or more communication networks; and a combiner for combining data sub-streams received at the communication device via the L communication paths into a communication data stream from the further device for processing at the communication device.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
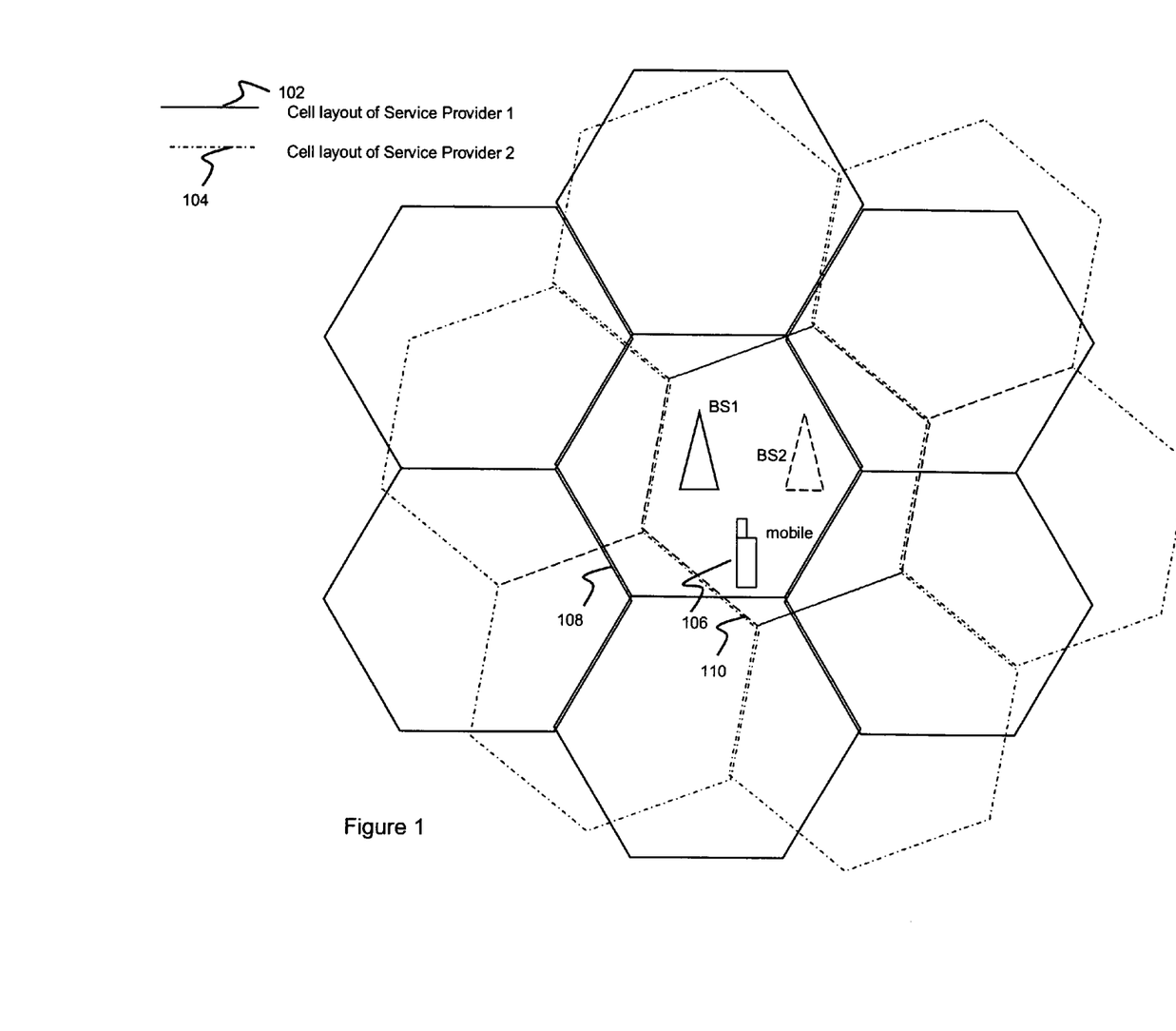
FIG. 1 is a schematic drawing illustrating cell layouts of different mobile/cellular service providers.

FIG. 1 illustrates a scenario where more than one cellular/mobile service providers 102, 104 exist in a geographical region. No matter where a mobile 106 is located, the mobile 106 is within a cell of more than one cellular/mobile service provider i.e. cells 108 and 110. This is due to the fact that although the cell layout and other aspects of network design are in general different or may not be known publicly from one cellular/mobile service provider to the next, each service provider provides service to subscribers' mobile wherever it is in the geographical region of coverage.

Figure 2:
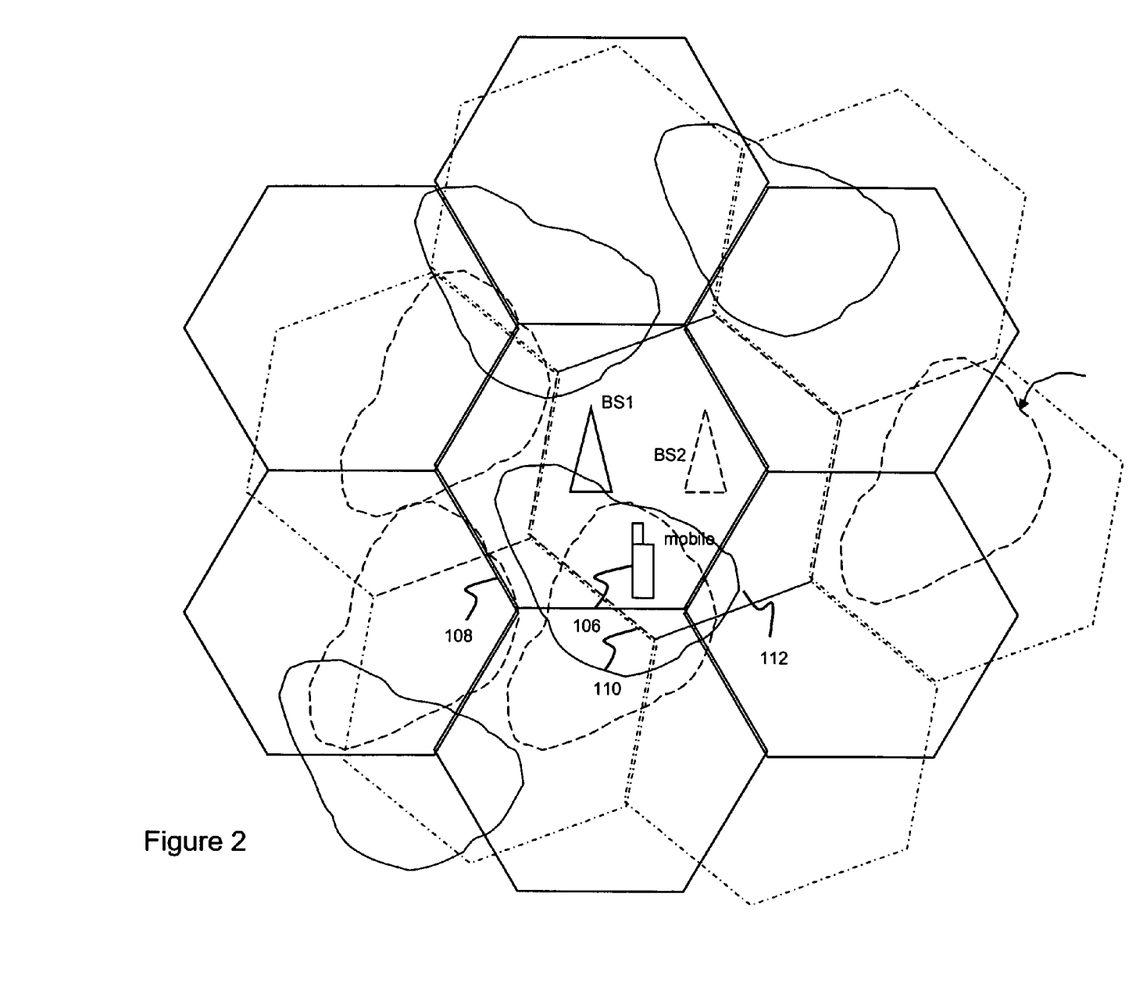
FIG. 2 is a schematic drawing illustrating the availability of communication from one or more communication service providers.

In addition, and as illustrated in FIG. 2, there are areas (growing rapidly in coverage and in numbers) that provide for access to internet and related services via wireless local area networks (WLAN) and wired networks (generically referred to as local area network or LAN, cable, phone dial up, ADSL, DSL etc) illustrated e.g. at numeral 112. Hence there are multiple options that a user may have for accessing data communication services. These options may further depend on the nature of communication that a user may wish to access. For instance, a voice call may be initiated using the mobile phone 106 only on a cellular/mobile service provider's network. However, internet access (including access to email, enterprise servers, computers etc) may be possible on several other networks.

With the growing need for communication services and the need for having faster data rates, systems have been invented to provide higher and higher data rates for any service. Instances include 2G (IS-95, GSM) to 2.5G (GPRS, HSCSD, EDGE etc) to 3G (WCDMA, CDMA2000, UMTS) for the cellular/mobile systems, internet access via dial-up, DSL, ADSL, cable, LAN, MAN etc for the wired systems, and WLAN, Bluetooth, UWB for the wireless systems. Each of these systems is self-sufficient and independent of the others in that the systems can be used to provide the service the systems are designed for on their own. Each user is provided a certain resource on the communication system and this resource is used by the user to access the communication service. This resource called "channel" is assigned to the user upon request either by the user himself or by the communication system if the system recognizes the need for the user to communicate. Assignment of channels and then the use of the channels are controlled by the communication service provider and may require user authentication and other steps.

Each channel assigned to a user on a given communication service provider comes with its capabilities and limitations. For instance, a GSM channel assigned to a user for making a voice call typically transmits data at a rate of 9600 bps. Hence if a user wishes to send data at a rate higher than 9600 bps on a GSM channel, it may not be possible. This also poses a fundamental challenge to the users as the users seek higher data rates and other improved QoS measures. Also, different communication service providers may not necessarily work with each other to deliver improved QoS to the users as the providers may be competing with each other.

Example embodiments of the present invention provide methods for accomplishing improvements in data rates and QoS while combining the various communication resources available in a manner that no changes in the service providers' infrastructures are required.

The example embodiments enable, at least, three types of communication, (i) high data rate (high speed) communication between a mobile station and a data server that communicates with the wireless/cellular/mobile service provider(s) of the mobile station; (ii) high data rate communication between a mobile station and another mobile station (peer-to-peer communication) where the wireless/cellular/mobile service providers of the two mobile stations may or may not be the same; and (iii) high data rate (high speed) communication between a mobile station and the Internet via an Intermediate Data Server that communicates with the wireless/cellular/mobile service provider(s) of the mobile station. A handshake is established in the example embodiments between the two communicating entities (between a mobile station and data server, between two mobile stations). The independent communication channels to be used, the details of the actual data transfer protocol, and addressing etc are established. Then the high speed data communication begins. The example embodiments are further extended to provide for high data rate and high QoS communication between two communicating entities (between mobile station & data server, between mobile station & mobile station) simultaneously and independently using communication service providers' infrastructure that can be wired/cellular/mobile/wireless.

A first example embodiment provides high speed communication between a mobile station served by one or more cellular/mobile service providers and a data server that communicates with the cellular/mobile service providers of the mobile station via a packet switched (for instance internet) network or a circuit switched (such as telephone network) network.

Figure 3:
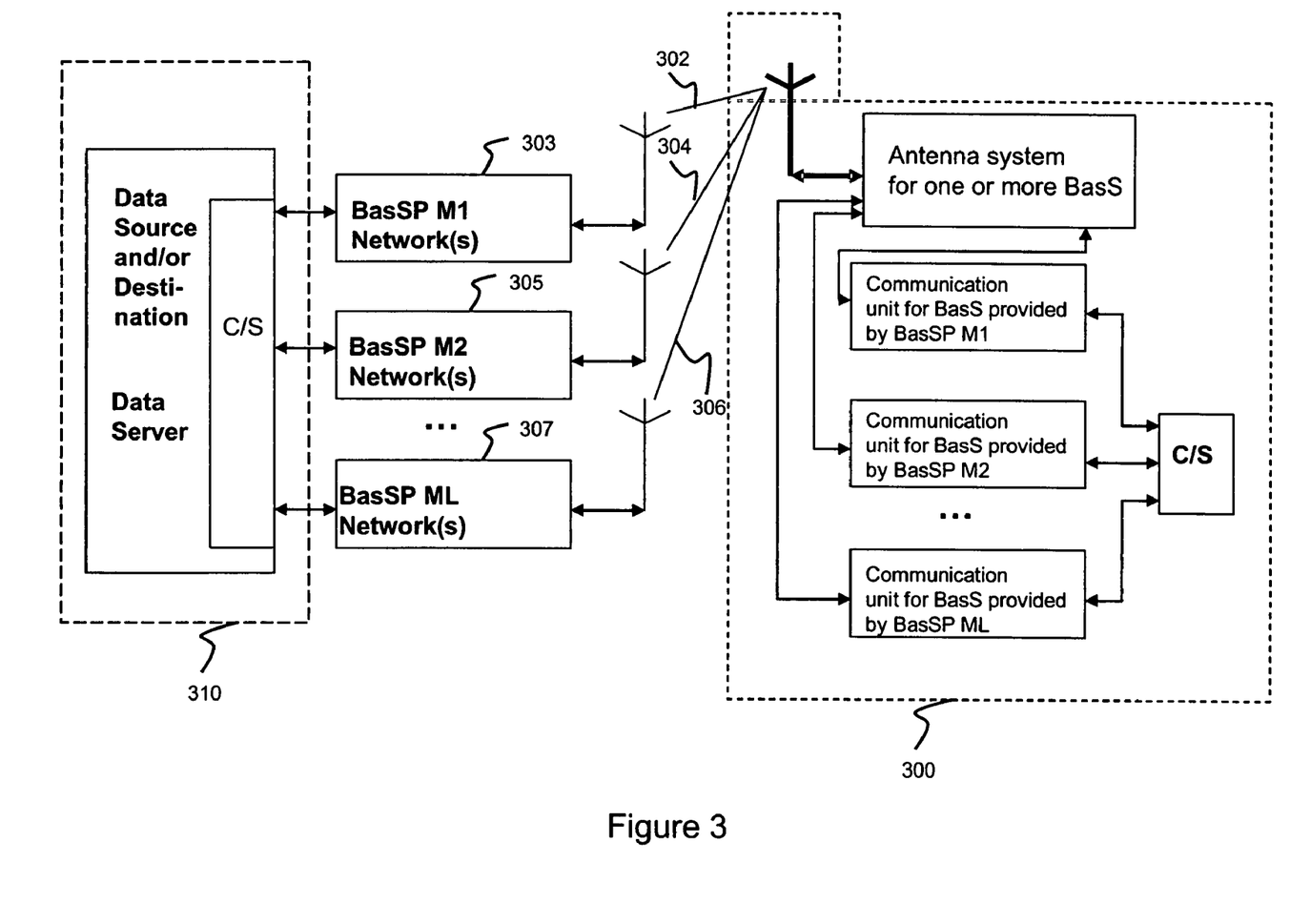
FIG. 3 is a schematic drawing illustrating communication between a mobile station and a data server in an example embodiment.

Refer to FIG. 3. In the first embodiment, the user with a mobile station 300 (phone, PDA, Laptop computer etc) uses data transmission that makes use of one or more service providers. This is e.g. for accessing data which could be generated as a result of video-conference, email, web-site/computer server access etc. In the first embodiment, the mobile station 300 selectively utilizes different communication paths e.g. 302, 304, 306 provided by respective service providers e.g. 303, 305, 307. Each of the communication paths 302, 304, 306 uses one or more communication channels of the respective service providers 303, 305, 307 for communication with the mobile station 300. The simultaneous use of communication channels and the network infrastructure from one or more service providers is done in an independent manner. Thus, no changes need to be made to the infrastructure of the respective service providers' infrastructures.

Suppose there are N service providers M1, M2, ..., MN. Each one of these service providers may be a cellular/mobile service provider providing one or more channels as a communication path to the mobile station 300 on the network of the respective service providers for data communication. Suppose that the mobile station 300 subscribes to the respective service providers via a subscription or a SIM (USIM for 3G) card or some other equivalent method or modem for establishing identity for service.

In the first embodiment the mobile station 300 subscribes to one or more service providers, say BasSP M1 303, BasSP M2 305, ..., BasSP ML 307, and the mobile station 300 has L SIM cards. One or more or all of the SIM cards are used simultaneously and independently to receive one or more communication paths from the respective service providers, which are combined to achieve high data rate communication. Note that not all service providers need to be distinct. For instance BasSP M1 303 may be same as BasSP M2 305. In the one embodiment, high data rate communication is accomplished by taking L independent units capable of receiving/sending data and then having a data combiner/splitter (which is realized either in hardware or software) at the mobile station 300. An equivalent data combiner/splitter is also used at the data server 310.

It is noted that a single SIM (USIM for 3G) card or other equivalent modem may be configured to establish a multi-channel communication path. Alternatively, and/or additionally, multiple single-channel SIM (USIM for 3G) cards or other equivalent modems may be utilized, with one or more single-channel SIM (USIM for 3G) cards or other equivalent modems being used to form a multi-channel communication path of a particular service provider.

For packet switched networks, the partitioning of data may take place in the following manners in example embodiments:

(a) Take the original data, partition into multiple sub-streams for each path and then create IP packets for transmission over packet switched network for each of the sub-streams in an independent manner for each path, (b) Take the data, create the IP packets for transmission over packet switched network and then create sub-streams of IP packets for each path, (c) Take the data, create the IP packets for transmission over packet switched network, and then partition each IP packet into multiple sub-packets for respective paths and re-encapsulate each sub-packet into an IP packet for transmission as a sub-stream over packet switched network for each path.

The partitioning of the data may be based on at least one parameter. The parameters may comprise one or more user preferences, one or more monitored characteristics of the respective data paths, or both. The partitioning of the data may be adjusted during transfer depending on the parameters. The parameters may include cost, time taken for data transfer, delay, path quality etc.

One or more or all of the L SIM cards are used to communicate data (using GSM, GPRS, 3G, CDMA, their combination or other data transmission technologies) and hence in the aggregate the overall data rate is much more than what is achievable with only one SIM card and one service provider. The L independent units capable of sending/receiving data can be identical if the individual communication paths are the same for each of the L service providers. For example, a GPRS modem can send/receive data on one or more channels from a cellular/mobile service provider. The units may also be different if the data transmission and other QoS provided by each of the individual communication paths are different. The mobile station 300 and the data server 310 take into account the characteristics of each of the communication paths in selecting which service provider to use and in implementing the task of splitting the data for one or more of the communication paths. This includes the data rate capability of each communication path, data requirements, pricing, channel conditions, and other QoS parameters.

The data server 310 communicates with the cellular/mobile service providers of the mobile station 300 via a packet switched (for instance internet) network or a circuit switched (such as telephone network) network.

The mobile station 300 or the data server 310 establish the initial contact with each other via one of the service providers (e.g. a SIM card is used for mobile station identification) whereby a set of one or more communication paths are established that will be used for data transfer, and then the service providers in the set are contacted to establish data transfer on each of the communication paths via the SIM cards for the respective service providers. The transmitter (that is either the mobile station 300 or the data server 310) then takes the high speed data stream, splits the data streams into separate data sub-streams appropriate for transmission over each of the communication paths. The receiver (that is either the mobile station 300 or the data server 310) takes the data streams arriving via the communication paths, and combines the communication paths into one data stream for eventual use. The set of communication paths to be used may also be determined and stored in the mobile station 300 and the data server 310 for all data transfers. This set may also be dynamic in nature.

It is noted that "within" a single communication path, the number of channels utilized may vary between the end-points of the communication path, e.g. between a mobile station and a data sever in an example embodiment. In such an embodiment, a service provider may have provided multiple communication channels between the mobile station and an intermediate element of the network infrastructure, such as a base station or switch architecture, on the one hand, and a single communication channel between the intermediate element and the data server on the other hand, which may be a dedicated high-speed communication link.

In the following, different application scenarios of the first example embodiment will be described.

A. Data Communication between Data Server and Mobile Station: One channel from one or more cellular/mobile service providers. The mobile station 300 holds one SIM card (or USIM for 3G) for each of the paths (which can be GSM, GPRS, 3G, CDMA and so on). For instance, if there are three cellular/mobile service providers (say Singtel, M1, and StarHub in Singapore), then the mobile station 300 may subscribe to each of the three for GPRS service, and use three SIM cards (one from each). Thus up to 3 independent and simultaneous GPRS connections can be established to communicate with the data server 310. This requires no change to the currently existing network infrastructure of the three cellular/mobile service providers.

B. Data Communication between Data Server and Mobile Station: One or more channels from one or more cellular/mobile service providers. The mobile station 300 holds one SIM card (or USIM for 3G) for each of the paths (which can be GSM, GPRS, 3G, CDMA and so on) from each of the cellular/mobile service providers. For instance, if there are three cellular/mobile service providers (say Singtel, M1, and StarHub in Singapore), then the mobile station 300 may subscribe to each of the three for GPRS service, and use five SIM cards (2 from SingTel, 2 from M1, 1 from StarHub). Thus up to 5 independent and simultaneous GPRS connections can be established to communicate with the data server 310. This requires no change to the currently existing network infrastructure of the three cellular/mobile service providers.

C. Data Communication between Data Server and Mobile Station: One or more channels possibly of different type from one or more cellular/mobile service providers. The mobile station 300 holds one SIM card (or USIM for 3G) for each of the paths (which can be GSM, GPRS, 3G, CDMA and so on) from each of the cellular/mobile service providers. For instance, if there are three cellular/mobile service providers (say Singtel, M1, and StarHub in Singapore), then the mobile station 300 may subscribe to each of the three for cellular/mobile service, and use five SIM cards (2 from SingTel one for GSM & one for GPRS, 2 from M1 both GPRS, 1 from StarHub for 3G). Thus up to 5 independent and simultaneous connections having different data rate and QoS can be established to communicate with the data server 310. This requires no change to the currently existing network infrastructure of the three cellular/mobile service providers.

D. Data Communication between Data Server and Mobile Station: One or more channels possibly of different type from one cellular/mobile service provider. The mobile station 300 holds one SIM card (or USIM for 3G) for each of the paths (which can be GSM, GPRS, 3G, CDMA and so on) from the cellular/mobile service provider. For instance, for SingTel in Singapore, a mobile station may subscribe to it and use five SIM cards (one for GSM, two for GPRS and two for 3G). Thus up to 5 independent and simultaneous connections having different data rate and QoS can be established to communicate with the data server 310. This requires no change to the currently existing network infrastructure of SingTel. Further, the mobile station 300 may subscribe to five SIM cards with Singtel, all for GPRS. Thus up to 5 independent and simultaneous connections can be established to communicate with the data server 310.

Figure 4:
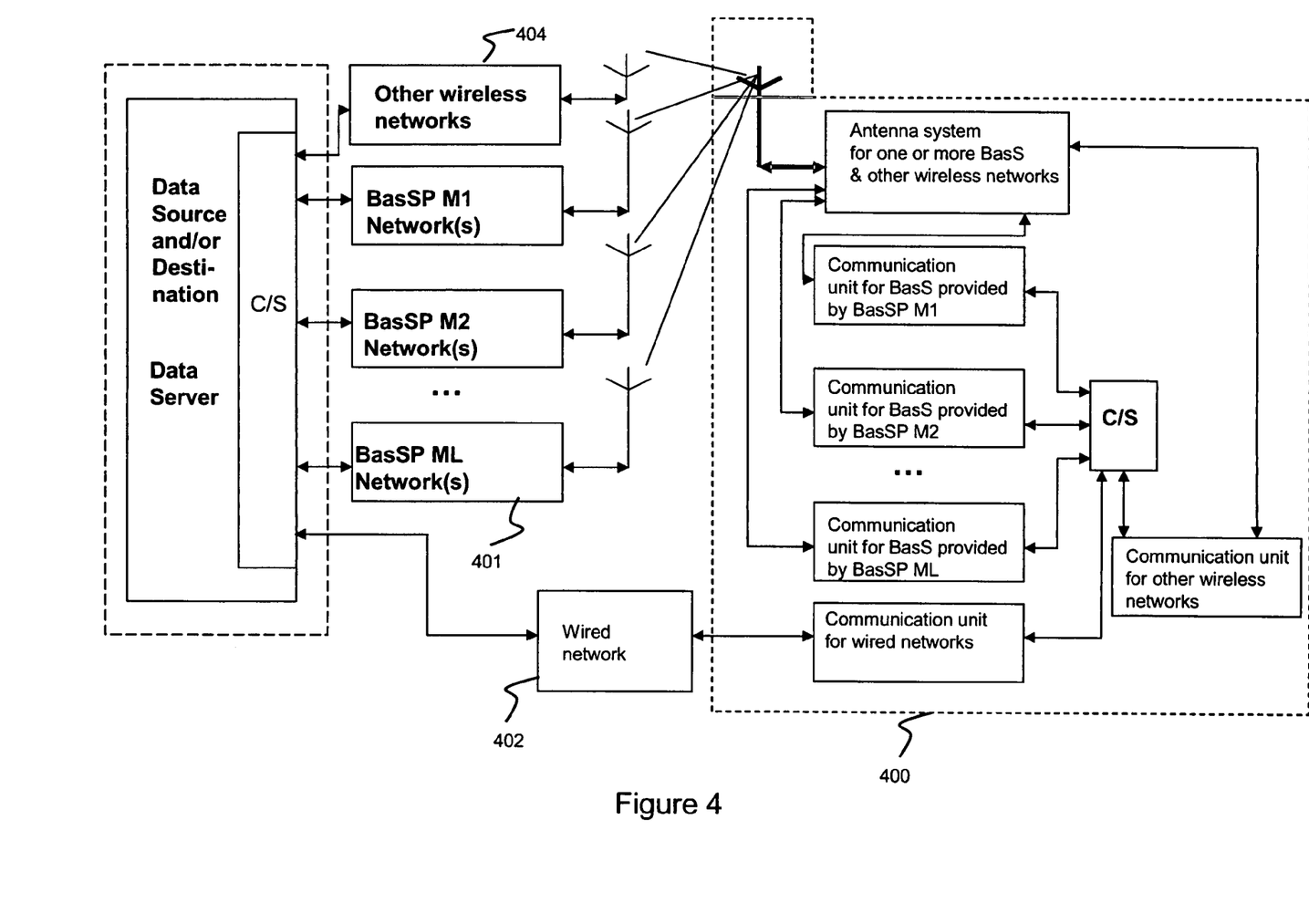
FIG. 4 is a schematic drawing illustrating communication between a mobile station and a data server in an example embodiment.

A second example embodiment is described with reference to FIG. 4. High speed communication between a mobile station, served by one or more cellular/mobile service providers and other networks (wired, wireless), and a data server connected to the service providers of the mobile station are enabled in the second example embodiment.

In addition to being in cells of one or more cellular/mobile service providers e.g. 401, a mobile station 400 can also transmit/receive data from one or more wired/wireless networks e.g. 402/404 (such as WLAN, LAN, cable, DSL, ADSL, and so on) depending on its actual location.

In this example embodiment, the mobile station 400 takes advantage of the availability of one or more channels on these wired/wireless networks e.g. 402/404 in order to further enhance the data rate and other QoS parameters. All the communication paths from one or more service providers e.g. 401, wireless networks e.g. 404, and wired networks e.g. 402 are combined independently/simultaneously to provide for high data rate communication between the mobile station 400 and data server 410.

In the following, different application scenarios for the second embodiment will be described.

A. Data Communication between Data Server and Mobile Station: One or more channels from a wired network and one or more channels from a wireless network. For instance, the mobile station 400 can now communicate with the data server 410 using one or more WLAN channels as well as a DSL connection.

B. Data Communication between Data Server and Mobile Station: One or more channels from a wired network, a wireless network, and cellular/mobile network. For instance, the mobile station 400 may use 3G to communicate with the data server 410. As soon as the mobile station 400 detects the availability of WLAN 404, the mobile station 400 may now switch to a mode where both WLAN and 3G are used to communicate with the data server 410. A wired network e.g. 402 may also be added if available. This includes the embodiments when (i) only wired channels (cable, dial-up, and ADSL) are used; or (ii) only wireless channels (one or more channels of WLAN, UWB) are used; or (iii) only one or more channels of cellular/mobile channels are used; or (iv) a combination of these are used.

In some cases, it may be desirable to not alter the configuration of the existing data server 410. To address this issue and to still provide for a high speed and high QoS communication between a mobile station and a data server without altering the configuration of the network infrastructure of the service providers, the following two embodiments are described. An Intermediate Data Server is placed between the data server (that is the source and/or destination of data) and the communication service providers' infrastructure. The Intermediate Data Server communicates with the data server preferably via a high speed link using well established systems and methods. In addition, the Intermediate Data Server is also connected to the Internet preferably via a high speed link using well established systems and methods. It is the Intermediate Data Server that will provides for data splitting and combining, user authentication, and many other services associated with providing high speed and high QoS communication between (i) the mobile station and data server; and (ii) the mobile station and the Internet.

Figure 5:
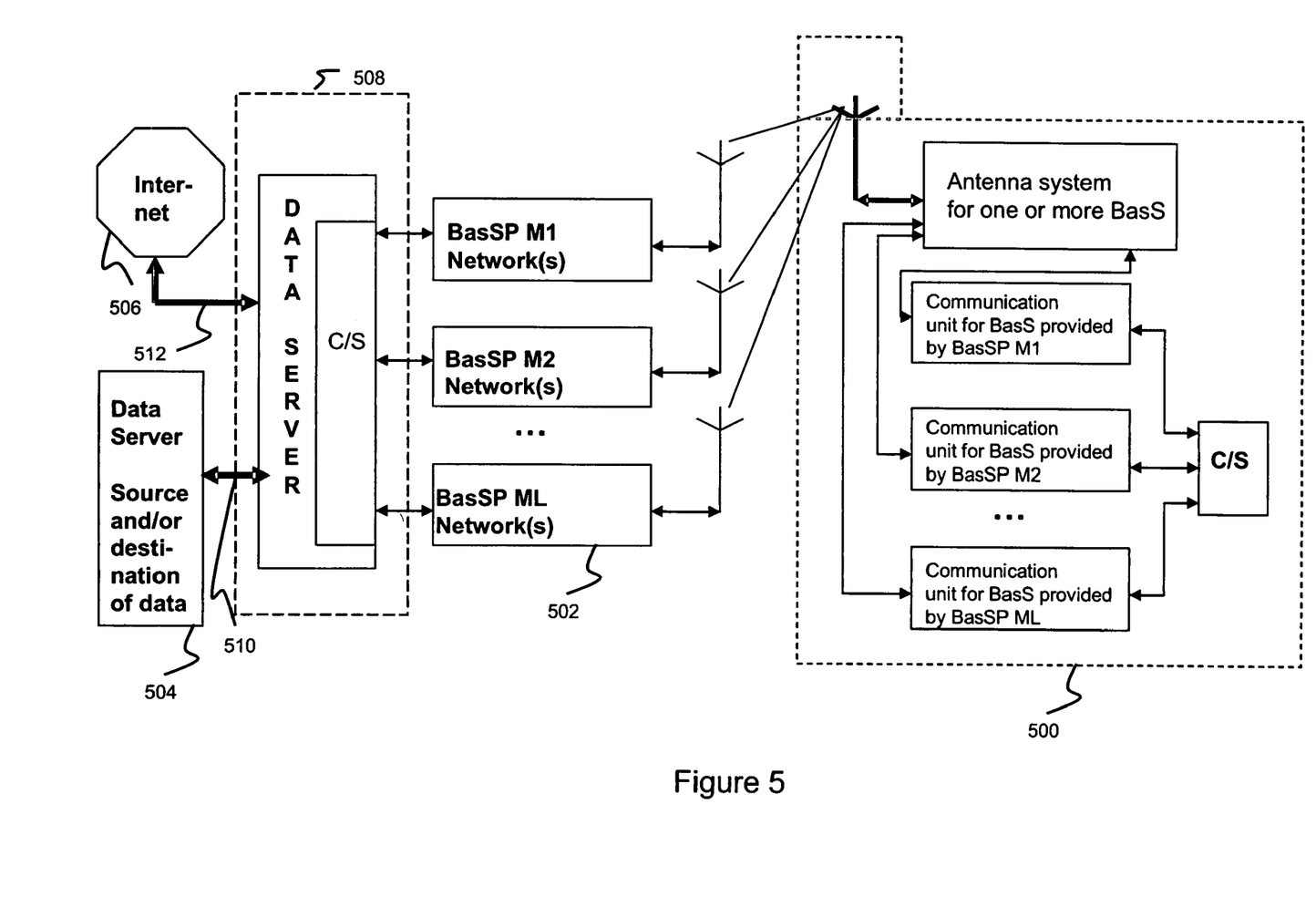
FIG. 5 is a schematic drawing illustrating communication between a mobile station and a data server or the internet according to an example embodiment.

In a third example embodiment, described below with reference to FIG. 5, high speed communication between a mobile station 500 served by one or more cellular/mobile service providers e.g. 502 and a data server 504 or the Internet 506 is enabled. The data server 504 communicates with an Intermediate Data Server 508 via preferably a high speed link 510. Similarly, the Intermediate Data Server 508 communicates with Internet 506 via preferably a high speed link 512. The Intermediate Data Server 508 communicates with the cellular/mobile service providers e.g. 502 of the mobile station 500 via a packet switched (for instance internet) network or a circuit switched (such as telephone network) network.

The third example embodiment is similar to the first example embodiment described above with the modification that the Intermediate Data Server 508 is placed between the data server 508 and the communication service providers e.g. 502 of the mobile station 500. This Intermediate Data Server 508 not only enables high speed access to the data server 504 but can also be used for high speed and high QoS internet 506 access. The Intermediate Data Server 508 communicates with the data server 504 and the Internet 506 preferably via respective high speed links 510, 512 using well established systems and methods.

The mobile station 500 now communicates with the Intermediate Data Server 508 which in turn performs functions required for data communication between (i) the mobile station 500 and data server 504; and (ii) the mobile station 500 and the Internet 506. These functions include tasks such as (i) user authentication; (ii) retrieving/receiving information from the data server 504, splitting the data and communicating the data to the mobile station 500; (iii) receiving/retrieving information from the mobile station 500 via different channels, combining the data, and communicating the data to either the data server 504 or the Internet 506.

Given the description above and of the first example embodiment, the completeness of the method and its advantages in the third embodiment will become clear to those skilled in the art.

Figure 6:
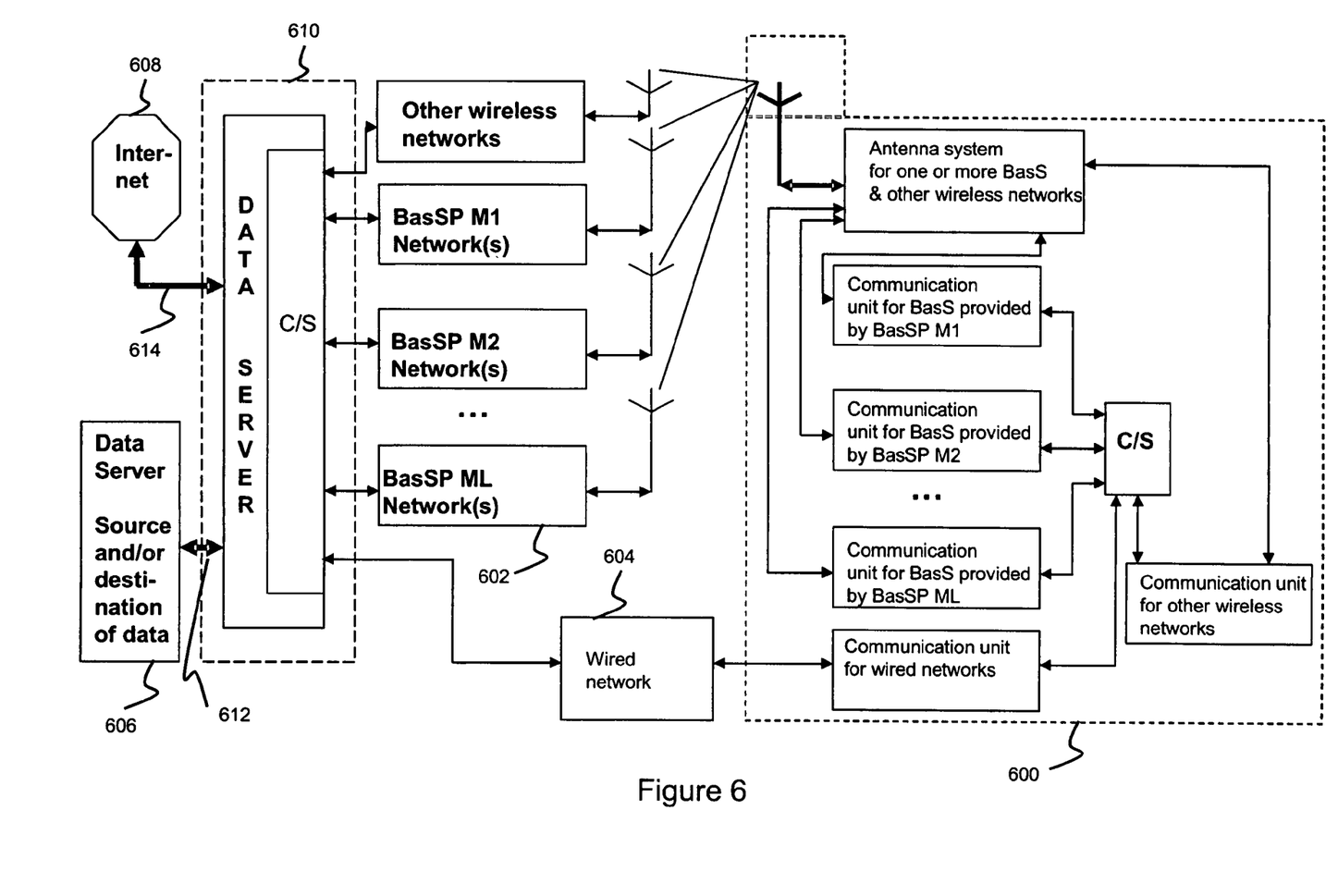
FIG. 6 is a schematic drawing illustrating communication between a mobile station and a data server or the internet according to an example embodiment.

In a fourth example embodiment, described below with reference to FIG. 6, high speed communication between a mobile station 600, served by one or more cellular/mobile service providers e.g. 602 and other networks e.g. 604 (wired, wireless), and a data server 606 or the Internet 608 is enabled. The data server 606 communicates with an Intermediate Data Server 610 via preferably a high speed link 612. Similarly, the Intermediate Data Server 610 communicates with Internet 608 via preferably a high speed link 614. The Intermediate Data Server 610 communicates with the cellular/mobile/ wired service providers e.g. 602 of the mobile station 600 via a packet switched (for instance internet) network or a circuit switched (such as telephone network) network.

The fourth embodiment is similar to the second embodiment described above with the modification that the Intermediate Data Server 610 is placed between the data server 606 and the communication service providers e.g. 602 of the mobile station 600. This Intermediate Data Server 610 not only enables high speed access to the data server 606 but can also be used for high speed and high QoS internet 608 access. The Intermediate Data Server 610 communicates with the data server 606 and the Internet 608 preferably via respective high speed links 612, 614 using well established systems and methods.

The mobile station 600 now communicates with the Intermediate Data Server 610 which in turn performs functions required for data communication between (i) the mobile station 600 and data server 606; and (ii) the mobile station 600 and the Internet 608. These functions include tasks such as (i) user authentication; (ii) retrieving/receiving information from the data server 606, splitting the data, and communicating the data to the mobile station 600; (iii) receiving/retrieving information from the mobile station 600 via different channels, combining the data, and communicating the data to either the data server 606 or the Internet 608.

Given the description above and of the second embodiment, the completeness of the method and its advantages in the fourth embodiment will become clear to those skilled in the art.

The embodiments described above deal with data communication between one data server and a mobile station. In many cases, the mobile station may wish to communicate with more than one data servers or several data servers may wish to communicate with a mobile station at the same time.

When the mobile station wishes to communicate with one or more data servers simultaneously, it takes all the possible communication resources (one or more service providers, other wireless networks, wired networks etc) and divides the resources up in a way so as to establish simultaneous/independent communication links with each of the data servers. These resources can be continually monitored and reassigned to the respective communication links depending on the need and availability of the resources.

Figure 7:
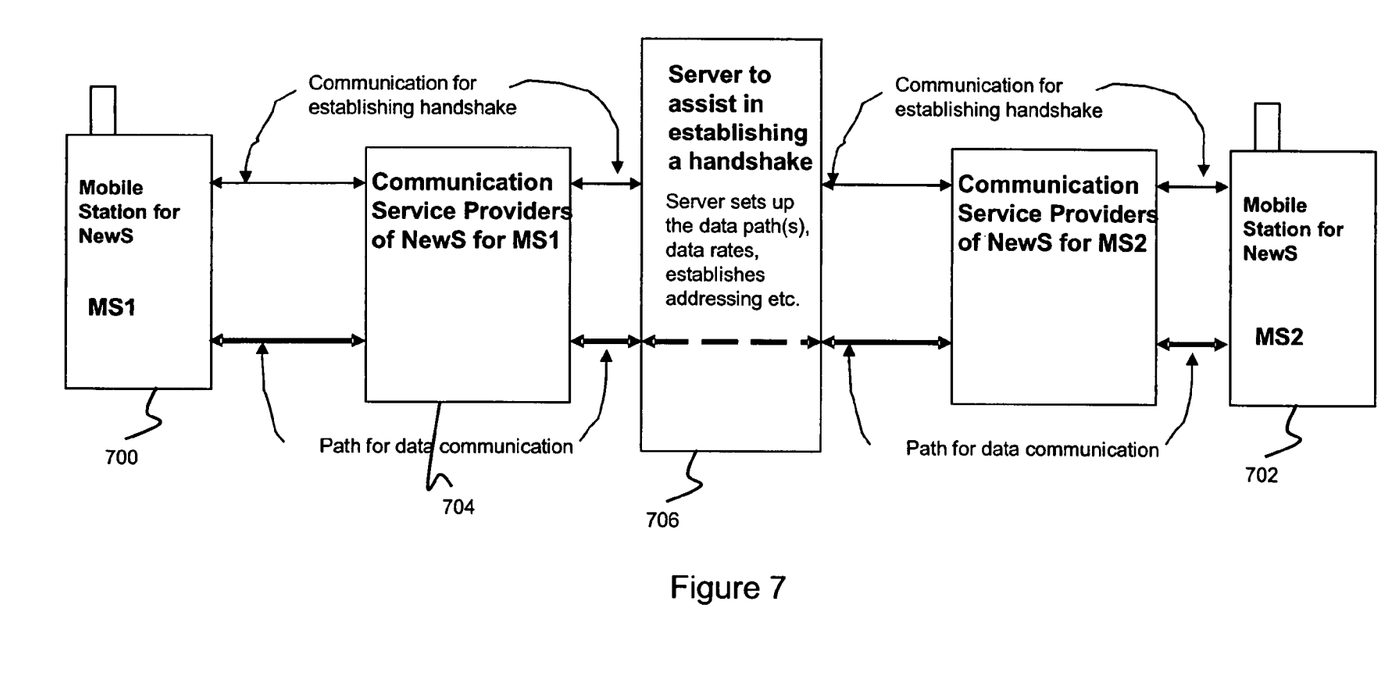
FIG. 7 is a schematic drawing illustrating communication between two mobile stations according to an example embodiment.

In a fifth example embodiment, described below with reference to FIGS. 7 and 8, high speed communication between two mobile stations 700, 702 served by respective communication service providers e.g. 704 is enabled. In general, the service providers e.g. 704 for the mobile stations 701, 702 may not be the same. For instance, one may get service from SingTel and may wish to make a high data rate call (for instance video calling) to a friend who gets his service from StarHub.

The two mobile stations 700, 702 establish a handshake first in terms of one or more communication paths that will be used, the data rates, the electronic addresses for accessing these channels (TCP/IP address, phone numbers, other addresses), and the overall protocol for communication on these channels. The communication paths for data transfer are established via the respective SIM's for each of the service providers for the mobile stations. The transmitter (that is either of the two mobile stations 700, 702) then takes the high speed data stream, splits the data stream into data streams appropriate for transmission over each of the communication paths and transmits the data streams on the communication paths. The receiver (that is either of the two mobile stations 700, 702) takes the data streams arriving via the communication paths, and combines the data streams into one data stream for eventual use. The set of communication paths to be used may also be determined and stored in the mobile stations 700, 702 for all data transfers. This set may also be dynamic in nature.

The handshake may be established between the two mobile stations 700, 702 with the assistance of a server 706 that both module station 700, 702 communicate with. Once the handshake is established, the two mobile stations 700, 702 can either perform data transfer via a data server or directly with each other.

Figure 8:
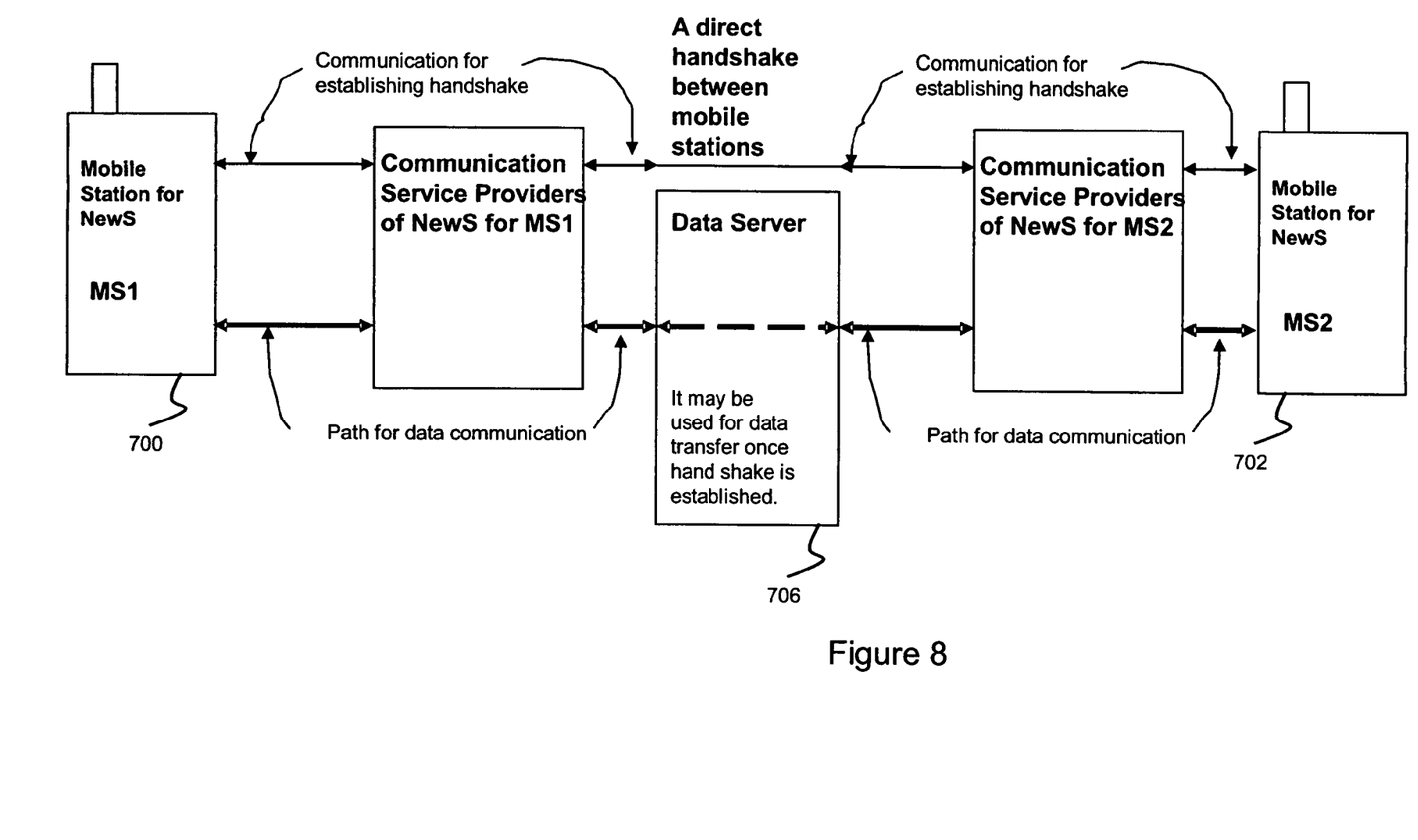
FIG. 8 is a schematic drawing illustrating communication between two mobile stations according to an example embodiment.

Alternatively, the handshake may be established by the mobile stations 700, 702 directly when one contacts the other, as illustrated in FIG. 8. The mobile stations 700, 702 may then move to perform data transfer either directly or with the assistance of the data server 706.

In all instances, the mobile stations 700, 702 may be served by different communication service providers.

Based on the embodiments for communication between a mobile station and a data server and between two mobile stations, it will become apparent to those skilled in the art that the present invention can also be used when a mobile station wishes to communicate with a data server and another mobile station simultaneously, in different embodiments.

It is noted that in the above description of the different example embodiments, the mobile stations may be integrally provided with the components and/or circuitry for implementing the communication techniques described. However, it will be appreciated by a person skilled in the art that in different embodiments, ancillary devices may be provided adapted to interact with existing mobile stations in a manner so as to implement the communication techniques according to embodiments of the present invention. The interaction between the ancillary device and the existing mobile station may e.g. be established using ad-hoc wireless techniques such as Bluetooth. The ancillary device may e.g. be of a clip-on design or integrated with a battery pack for the existing communication device.

Location Services

Location for mobile devices is becoming quite important for the delivery of services. In this regard, embodiments of the present invention can be used to provide location services in the following manner. If a mobile station subscribes to use the data services of three cellular/mobile service providers. Each cellular/mobile service operator may provide the location information to the mobile station in an independent manner using its own network infrastructure. This information can be combined in a way so as to obtain more accurate information about the mobile station. For instance, if each of the cellular/mobile network provides cell_ID (the geographic location of the cell of the cellular/mobile service provider the particular mobile station is in), then an intersection of the cell_ID of more than one cellular/mobile service provider will provide more accurate information about the location of the mobile station.

In a similar manner, location information obtained from different cellular/mobile service providers and other wireless/wired service providers can be combined to obtain more accurate information about the location of the mobile station and then utilized by the mobile station and location based service providers for secure/receive location based services.

Data Combiner & Splitter

Several strategies can be followed for splitting the data for communication over the independent paths, each of which may include one or more channels, in different embodiments. In general the data of Size S is split into K parts, where each part may have different size, say $S1, S2, \ldots, SK$. These parts are then sent on the channels being used in a way so as to minimize the total transmission time. For instance, if L channels are being used having data rates D1, D2, ..., DL, then the data may be split into L parts such that size S1 is given by S1=D1*T, S2=D2*T, ..., SL=DL*T, where T=S/D, D=D1+D2+...+DL. This ensures that the data transmission takes the least amount of time. Further if the data rates vary (as is the case many times), then the file split may be done in a dynamic manner. One strategy can be to dynamically create K parts as data transmission occurs. K can be much larger than L. As a channel completes the transmission of the part assigned to it, the next part can then be created and assigned from the remainder data for transmission and so on. The transmitter can also monitor the data rates on the respective channels and adjust the size of the parts accordingly. The channel with higher data rate gets a bigger size part and so on.

Security and Reliability

Multiple communication paths, each of which may include one or more channels, used for data communication simultaneously, can enhance the security/reliability of communication in different embodiments of the present invention. For instance, the data may be encrypted on the various paths by the transmitter and decrypted at the receiver. Further, use of multiple paths provides a way to build spread spectrum based (direct sequence spread or other such techniques) secure/reliable communication systems. Reliability may also be improved by the use of techniques such as coding techniques. The additional data created as a result of encryption/spread spectrum/coding may be sent on multiple paths. The transmitter may also do paths hopping (use of different paths in a pseudo-random manner) in order to provide for secure exchange of information.

It is noted that in such embodiments, the security enhancement may be provided without an actual increase in user data rate transmission. As such, embodiments of the present invention are not limited to providing an increased user data transmission rate as an objective. Rather, embodiments of the present invention may provide security, reliability, or both as an independent value-added features. However, it will be appreciated by a person skilled in the art that in different embodiments of the present invention, user-data rate increase, security and/or reliability increase may be provided as concurrent advantages, with the ability to selectively cater for specific requirements.

Increasing the Rate of Information Transmission Via Data Compression

Since the communication takes place between a receiver and a transmitter (which could be mobile terminals and a data server including the 'intermediate server') in embodiments of the present invention, the transmitter can use data compression techniques on the data and their partitions/parts in a way so as to further enhance the overall effective data rate. In this case, the information to be transmitted is compressed and then split for transmission over multiple paths. At the receiver, the various parts are first combined and then a decompression algorithm is used to construct the original information. In another embodiment, the information to be transmitted is split first and then compressed for transmission over multiple paths. At the receiver, the various parts are first decompressed using a decompression algorithm to construct the original information and then combined to construct the original information. The data compression algorithm may be a proprietary algorithm and known only to the mobile and the data server.

Interfacing of Data Streams on the Communication Paths with Applications

Since data sub-streams may be transmitted on multiple communication paths in embodiments of the present invention, the generation and/or processing of those sub-streams by applications such as video calling will now be considered. It will be appreciated by the person skilled in the art that customized applications may be provided, which include the required functionality of generating and/or processing the multiple sub-streams. Alternatively, where an existing application such as e.g. a multi media player application is capable of generating and/or processing multiple data streams, the sub-streams utilized in embodiments of the present invention may be directly interfaced to such an application without the need for modification of the relevant application.

Roaming

Embodiments of the present invention are suitable for seamless operation under roaming conditions. Embodiments of the present invention can be implemented without the need for modification of the existing network infrastructures of the involved service providers. Therefore, any existing roaming arrangements/infrastructure provisions put in place by a service provider in order to provide roaming capabilities merely affect the infrastructure characteristics of the relevant communication path. However, at a higher level, the selective utilization of one or more communication paths remains unchanged in embodiments of the present invention under roaming conditions. Each communication path comprises one or more communication channels provided by a service provider, with or without roaming and resulting involvement of one or more further service providers.

End to End Protocols for Data Transfer

The methods for data transfer as described in the example embodiments can provide for multiple communication paths without making any change to the overall configuration of the service providers' infrastructure. On a communication protocol level, it is e.g. possible to alter the aspects of existing communication protocols that only require changes at the transmitter/receiver in implementing the example embodiments to improve the overall performance of data communication using multiple communication paths. Instances of these include "sequencing" and "flow control" used in transport control protocol (TCP). The transmitters/receivers used in implementations of the example embodiments may employ their own protocols requiring changes only at the transmitter/receiver ends in a way that the multiple communication paths are used to provide an advantage. Such protocols may also be dependent on the application (video call, file download etc) and other performance criteria.

Figure 9:
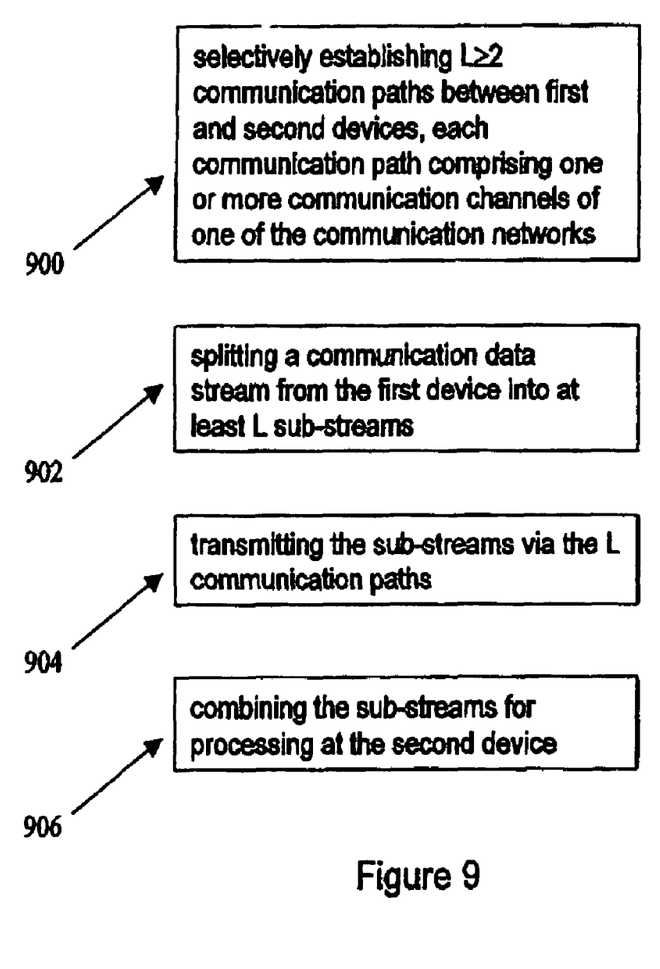
FIG. 9 shows a flow chart illustrating a method of conducting communication over one or more communication networks, according to an embodiment of the present invention.

FIG. 9 shows a flow chart illustrating a method of conducting communication over one or more communication networks, according to an embodiment of the present invention. At step 900, $L \geq 2$ communication paths are selectively established between first and second devices, each communication path comprising one or more communication channels of one of the communication networks. At step 902, a communication data stream from the first device is split into at least L sub-streams. At step 904, the sub-streams are transmitted via the L communication paths. At step 906, the sub-streams are combined for processing at the second device.

Embodiments of the invention present systems and methods to simultaneously utilize the network resources of one or more cellular/mobile/wireless network service providers in a more efficient manner to provide for better QoS to the wireless/mobile consumer. Embodiments of the invention may include one or more of the following features:

Independent paths all of one type (say all are GSM or GPRS or WLAN channels) from one or more cellular/mobile service providers (say one is Orange, other is Vodafone) are combined independently/simultaneously at the transmitters and/or receivers to deliver high data communication between a mobile station (MS) and one or more data servers.

Independent paths all of one type from one or more cellular/mobile service providers are combined independently/simultaneously at the transmitters and/or receivers to deliver high data communication between two or more mobile stations (MS).

Independent paths all of one type from one or more cellular/mobile service providers are combined independently at the transmitters and/or receivers to deliver high data communication simultaneously between two or more mobile stations (MS) and one or more data server of information.

The above three items, when independent paths of different types (GSM, CDMA, 3G, WLAN, Bluetooth, UWB, cable, ADSL, dial-up etc) from one or more communication service providers (cellular/mobile service providers, wireless service providers, wired service providers) are combined independently at the transmitters and/or receivers.

The mobile station and the data server adapted for the embodiments of the invention.

Improvements in other parameters that constitute quality of service (QoS) such as load balancing, pricing, call hand-off, roaming when embodiments of the invention are used.

Use of independent paths from one or more communication service providers to improve the location determination and its use for a mobile station (MS) in a wireless/cellular/mobile system.

The example embodiments seek to use the all available communications resources to enable high QoS (high data rate as well as other aspects of QoS) for cellular/mobile/wireless/wired communications. Also, the example embodiments described are such that the network infrastructure of the various communication service providers is utilized in an independent manner. Hence no change whatsoever may be required in the network infrastructure of the various communication service providers when these network infrastructures are utilized simultaneously and independently.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

ABBREVIATIONS

LAN: Local area network;
MAN: Metropolitan area network
WLAN: Wireless local area network
Wi-Fi: A popular name for WLAN technologies
CDMA: Code Division Multiple Access
WCDMA: Wideband CDMA
CDMA2000: Another wideband version of CDMA
UMTS: Universal Mobile Telecommunication System
PDA: Personal Digital Assistant
IS-95: second generation CDMA technology; also known as CDMAOne
2G: Second generation cellular/mobile communication systems
2.5G: 2.5 generation cellular/mobile communication systems
3G: Third generation
EDGE: Enhanced Data Rates for GSM Evolution
GPRS: General packet radio service
UWB: Ultra Wide Band
GSM: Global Mobile System
HSCSD: High speed circuit switched data
DSL: Digital subscriber line
ADSL: Asymmetric DSL
SIM: Subscriber Identity Module for GSM
USIM: Universal Subscriber Identity Module

The invention claimed is:

1. A method of conducting communication over at least a first and a second mobile communication networks, the method comprising:

providing a first mobile device subscribed to the first and to the second mobile communication networks;

establishing at least two communication paths between the first mobile device and a further device, wherein a first one of the communication paths comprises one or more subscribed communication channels of the first mobile communication network, and a second one of the communication paths comprises one or more subscribed communication channels of the second mobile communication network;

splitting a communication data stream originating from the first mobile device between the first mobile device and the further device into at least two sub-streams beginning at the first mobile device for respective ones of the at least two communication paths;

transmitting the two sub-streams via the one or more subscribed communication channels of the first and second communication paths, respectively; and combining the two sub-streams at the further device for processing at the further device, wherein the splitting and combining are conducted externally from the first and second mobile communication networks.

2. A method of conducting communication over at least a first and a second mobile communication networks, the method comprising:

providing a first mobile device subscribed to the first and the second mobile networks;

establishing at least two communication paths between the first mobile device and a further device, wherein a first one of the communication paths comprises one or more subscribed communication channels of the first mobile communication network, and a second one of the communication paths comprises one or more subscribed communication channels of the second mobile communication network;

splitting a communication data stream terminating at the first mobile device between the further device and the first mobile device into at least two sub-streams beginning at the further device for respective ones of the at least two communication paths;

transmitting the two sub-streams via the one or more subscribed communication channels of the first and second communication paths respectively; and combining the sub-streams at the first mobile device for processing at the first mobile device, wherein the splitting and combining are conducted externally from the first and the second mobile communication networks.

3. The method as claimed in claim 1 or 2, wherein the further device comprises a mobile station or a data server.

4. The method as claimed in claim 3, wherein the mobile station comprises one or more of a group consisting of a phone, a mobile phone, a PDA, a desktop computer, and a laptop computer.

5. The method as claimed in claim 3, wherein the data server comprises an intermediate data server connected to a further data server, the Internet, or both via dedicated respective data transfer links.

6. The method as claimed in claim 1 or 2, further comprising determining location information about the first, further, or both devices based on two or more of the communication paths.

7. The method as claimed in claim 1 or 2, further comprising adding further data to the communication data stream.

8. The method as claimed in claim 7, wherein the further data is added prior to, after, or both prior and after the splitting of the communication data stream.

9. The method as claimed in claim 7, wherein the further data is added during the splitting of the communication data stream.

10. The method as claimed in claim 7, wherein the further data is utilized to improve reliability of the communication.

11. The method as claimed in claim 10, comprising utilizing coding of the communication data stream to improve the reliability of the communication.

12. The method as claimed in claim 7, wherein the further data is utilized to improve a security of the communication.

13. The method as claimed in claim 12, comprising utilizing one or more of a group consisting of encryption, path hopping, and spread spectrum communications, to improve the security of the communication.

14. The method as claimed in claim 13, wherein two or more sub-streams are encrypted using different encryption codes.

15. The method as claimed in claim 1 or 2, further comprising compressing the data stream, at least one sub-stream or both.

16. The method as claimed in claim 1 or 2, wherein one or more of the communication paths comprise a varying number of subscribed communication channels between end-points of the communication path.

17. The method as claimed in claim 1 or 2, wherein one or more of the communication paths comprise one or more subscribed communication channels provided for the first mobile device by one or more communication networks under a roaming configuration.

18. The method as claimed in claim 1 or 2, wherein the communication paths comprise one or more of a group consisting of GSM, EDGE, GPRS, 3G, and CDMA.

19. The method as claimed in claim 1 or 2, wherein one or more data protocols used in the transmission of data are adapted at end points only in transmitting and receiving the two sub-streams.

20. The method as claimed in claim 19, wherein the data protocols comprise existing protocols, dedicated protocols, or both.

21. The method as claimed in claim 1 or 2, wherein the adaptation of the data protocols is dependent on an application, performance criteria, or both.

22. The method as claimed in claim 1 or 2, further comprising processing the data stream for the establishing of the communication paths, the splitting of the communication data stream, or both, based on resources on the communication paths, characteristics of the communication paths, or both.

23. The method as claimed in claim 22, wherein the processing is adjusted during transfer depending on the resources on the communication paths, the characteristics of the communication paths, or both.

24. The method as claimed in claim 1 or 2, wherein the establishing of the communication paths, the splitting of the communication data stream, or both, are based on the data stream.

25. The method as claimed in claim 24, wherein the establishing of the communication paths, the splitting of the communication data stream, or both, are based on providing enhanced communication in terms of one or more of a group consisting of data-rate, security, and reliability.

26. The method as claimed in claim 1 or 2, further comprising facilitating the establishing of the communication paths utilizing a server.

27. The method as claimed in claim 1 or 2, wherein the method is applied for providing enhanced communication for voice calling.

28. The method as claimed in claim 1 or 2, wherein at least one communication path is provided by a wired network.

29. The method as claimed in claim 1 or 2, wherein the communication paths comprise communication paths of different types.

* * * * *